US012724650B2

(12) United States Patent
Yu et al.

(10) Patent No.: US 12,724,650 B2
(45) Date of Patent: Sep. 1, 2026

(54) FABRIC-LESS ENGINE IO LOAD BALANCER

(71) Applicant: Dell Products L.P., Hopkinton, MA (US)

(72) Inventors: Rong Yu, West Roxbury, MA (US); Earl Medeiros, Fall River, MA (US); Thomas Rogers, Littleton, MA (US); Ramesh Doddaiah, Westborough, MA (US)

(73) Assignee: Dell Products L.P., Hopkinton, MA (US)

( * ) Notice: Subject to any disclaimer, the term of this patent is extended or adjusted under 35 U.S.C. 154(b) by 404 days.

(21) Appl. No.: 18/539,364

(22) Filed: Dec. 14, 2023

(65) Prior Publication Data

US 2025/0199878 A1 Jun. 19, 2025

(51) Int. Cl.
*G06F 9/50* (2006.01)
*G06F 11/34* (2006.01)

(52) U.S. Cl.
CPC .......... *G06F 9/5083* (2013.01); *G06F 9/5016* (2013.01); *G06F 11/3447* (2013.01)

(58) Field of Classification Search
CPC .................................................... G06F 9/5083
USPC ........................................................ 718/105
See application file for complete search history.

(56) References Cited

U.S. PATENT DOCUMENTS 10,296,255 B1 * 5/2019 Tummala ................ G06F 3/065
2011/0154165 A1 * 6/2011 Primadani .............. G06F 11/10 714/E11.034
2017/0109207 A1 * 4/2017 Li .......................... G06F 9/505

FOREIGN PATENT DOCUMENTS

CN 110035022 A * 7/2019 ........... H04L 49/102
WO WO-2021184741 A1 * 9/2021 ......... G06F 13/4068

* cited by examiner

*Primary Examiner* — Charlie Sun
(74) *Attorney, Agent, or Firm* — Anderson Gorecki LLP

(57) ABSTRACT

A storage array engine has two single-board storage directors with CPU complexes and PCIe switches that are interconnected by a fabric-less PCIe NTB. IO response times of the storage directors are modeled, e.g., as a function of controller memory interface bandwidth utilization, switch utilization, fall-through time of a non-mirrored segment of the volatile memory, central processing unit complex utilization, number of available data slots in the non-mirrored segment of the volatile memory, and average depth of all IO-related queues. Responsive to receipt of an IO, a data slot in either local or remote storage director memory is allocated based on the difference between computed IO response times of the storage directors. The fabric-less link is used to service IOs using remote memory, thereby mitigating additional loading of the local CPU complex.

20 Claims, 4 Drawing Sheets

Storage Array 100

FABRIC-LESS ENGINE IO LOAD BALANCER

TECHNICAL FIELD

The subject matter of this disclosure is generally related to data storage systems.

BACKGROUND

Electronic data storage is a critical infrastructure for organizations that rely on software for organizational processes. A typical datacenter includes clusters of server computers that access data storage nodes via network switches. The servers run instances of host applications that support organizational processes such as email, accounting, inventory control, e-business, and engineering. Host application data is maintained by the storage nodes, each of which includes one or more compute nodes. The data storage nodes may include, or be part of, storage arrays, storage area networks (SANs), and network-attached storage (NAS), for example, and without limitation. Individual host servers may implement load balancing by distributing IOs to available storage node ports in a round-robin manner.

SUMMARY

Some inventive features disclosed herein are predicated in part on recognition that IO latency skew between storage directors in a storage engine can result from misalignment of host server load balancing and storage director memory allocation policies. Host server load balancing software distributes IOs to available ports but does not adjust IO port distribution based on IO loading on the storage node from other host servers and other storage nodes. Storage director memory allocation policies may use local memory whenever a read-miss occurs. Consequently, one storage director within a storage engine can become more heavily loaded than the other storage director of that engine.

A method in accordance with some embodiments comprises: generating models of input-output (IO) response time for a first compute node and a second compute node of a storage engine, where the first compute node is connected with the second compute node via a fabric-less link between switches; responsive to receipt of a first IO by the first compute node, using the models to compute that workload on the first compute node exceeds workload on the second compute node by a predetermined amount; and responsive to workload on the first compute node exceeding workload on the second compute node by the predetermined amount, allocating a data slot in volatile memory of the second compute node for servicing the first IO via the fabric-less link.

An apparatus in accordance with some embodiments comprises: a storage engine comprising a first compute node and a second compute node connected via a fabric-less link between switches; a model of input-output (IO) response time for the first compute node; a model of IO response time for the second compute node; at least one emulation configured, responsive to receipt of a first IO by the first compute node, to use the models to compute that workload on the first compute node exceeds workload on the second compute node by a predetermined amount and, in response, allocate a data slot in volatile memory of the second compute node for servicing the first IO via the fabric-less link In accordance with some embodiments, a non-transitory computer-readable storage medium stores instructions that when executed by a computer perform a method comprising: generating models of input-output (IO) response time for a first compute node and a second compute node of a storage engine, where the first compute node is connected with the second compute node via a fabric-less link between switches; responsive to receipt of a first IO by the first compute node, using the models to compute that workload on the first compute node exceeds workload on the second compute node by a predetermined amount; and responsive to workload on the first compute node exceeding workload on the second compute node by the predetermined amount, allocating a data slot in volatile memory of the second compute node for servicing the first IO via the fabric-less link.

This summary is not intended to limit the scope of the claims or the disclosure. All examples, embodiments, aspects, implementations, and features can be combined in any technically possible way. Method and process steps may be performed in any order.

Various features and advantages will become more apparent from the following detailed description of exemplary embodiments in conjunction with the drawings.

DETAILED DESCRIPTION

The terminology used in this disclosure should be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" refer to features that are abstractions of other features such as, for example, and without limitation, tangible features. The term "physical" refers to tangible features that possibly include, but are not limited to, electronic hardware. For example, multiple virtual computers could operate simultaneously on one physical computer. The term "logic," if used, refers to special purpose physical circuit elements, firmware, software, computer instructions that are stored on a non-transitory computer-readable medium and implemented by multi-purpose tangible processors, and any combinations thereof. Embodiments are described in the context of a data storage system that includes host servers and storage arrays. Such embodiments are not limiting.

Some embodiments, aspects, features, and implementations include machines such as computers, electronic components, optical components, and processes such as computer-implemented procedures and steps. The computer-implemented procedures and steps are stored as computer-executable instructions on a non-transitory computer-readable medium. The computer-executable instructions may be executed on a variety of tangible processor devices, i.e., physical hardware. For practical reasons, not every step, device, and component that may be part of a computer or data storage system is described herein. Those steps, devices, and components are part of the knowledge generally available to those of ordinary skill in the art. The corresponding systems, apparatus, and methods are therefore enabled and within the scope of the disclosure.

Figure 1:
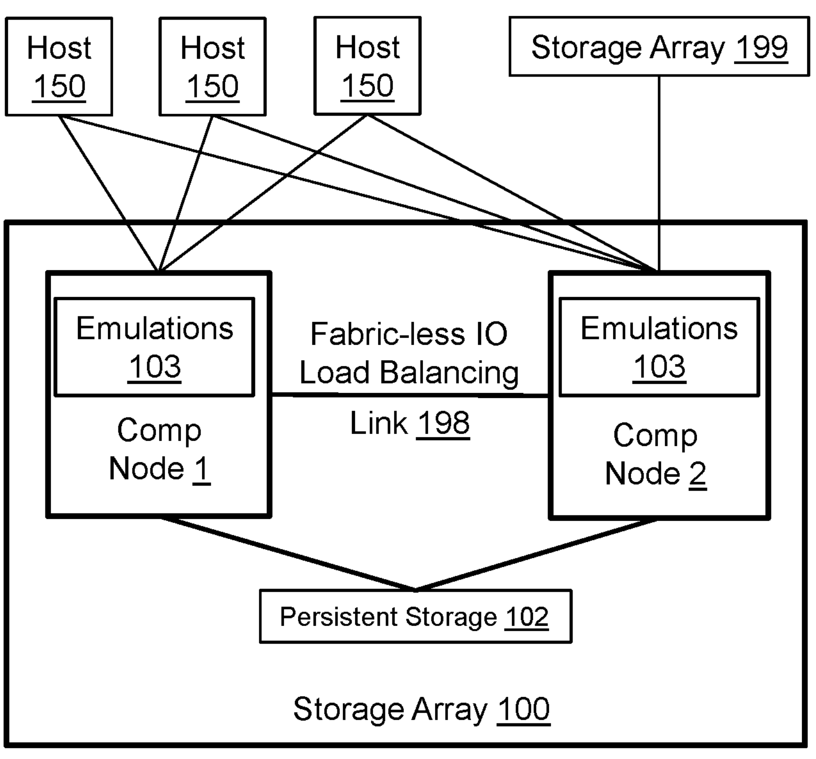
FIG. 1 illustrates a dual-director storage array with fabric-less IO load balancing.

FIG. 1 illustrates a single-engine, dual-director storage array 100 with fabric-less IO load balancing between paired compute nodes 1, 2. The compute nodes are interconnected as a failover pair and are commonly referred to as "storage directors" because they manage access to persistent storage 102 and run emulations 103 for completing different storage-related tasks and functions. Front-end emulations handle communications with host servers 150. For example, the front-end emulations receive IO commands from the host servers and return data and write acknowledgements to the host servers. Back-end emulations handle back-end IOs to access persistent storage 102. Data services emulations process IOs, such as by creating, using, and updating metadata that maps between logical block addresses of logical storage objects to which IOs from the host applications are directed and physical addresses on managed drives of the persistent storage 102. Remote data services emulations handle communications with a remote storage array 199, such as for storage object replication and remote snapshot generation. The compute nodes 1, 2 are subjected to collectively imbalanced IO loading from the host servers 150 and remote storage array 199. IO loading of the compute nodes is balanced via a fabric-less link 198 as will be described below.

Figure 2:
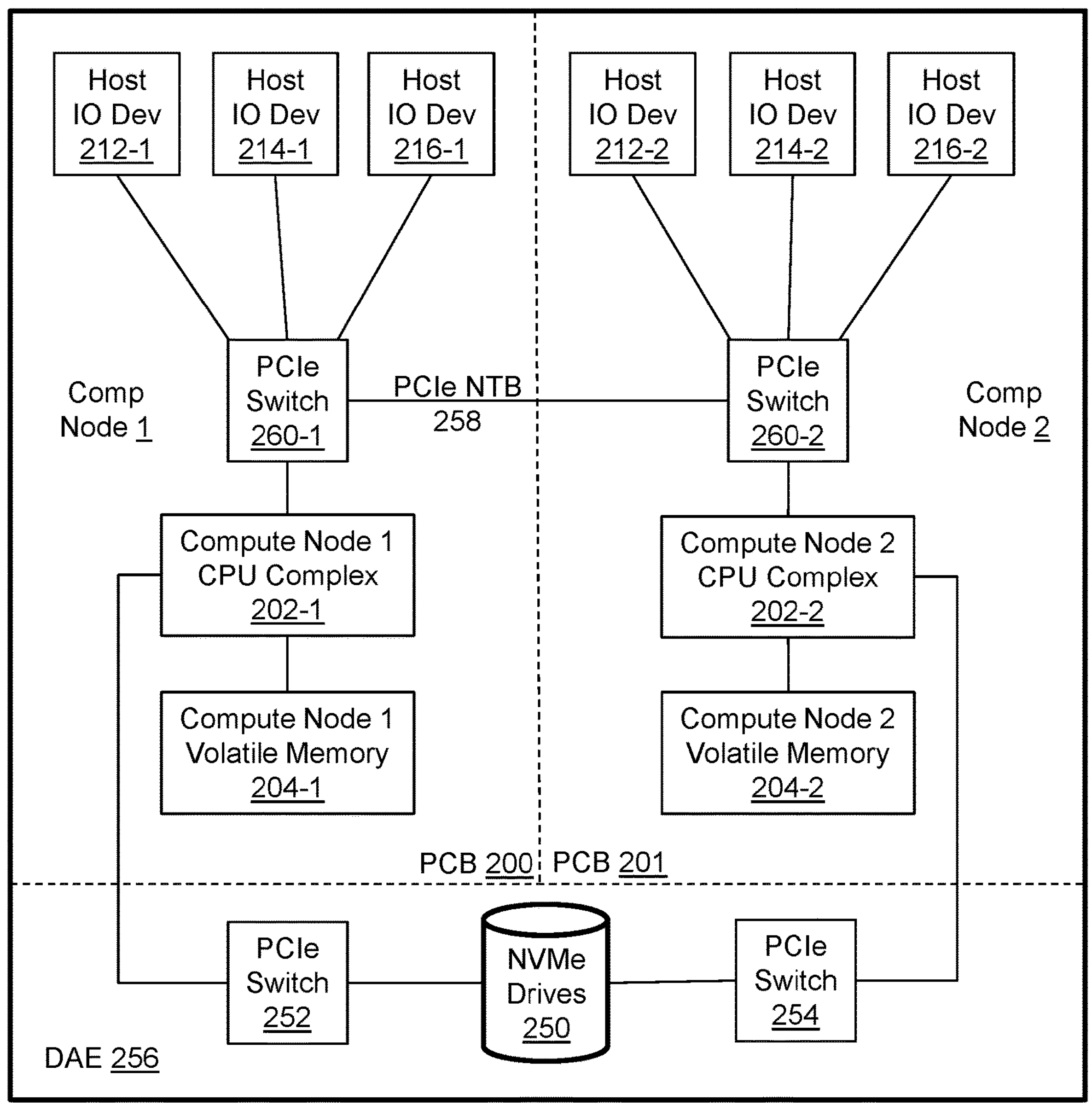
FIG. 2 illustrates the storage array in greater detail.

FIG. 2 illustrates the storage array 100 in greater detail. Compute node 1 is implemented on a single printed circuit board (PCB) 200 that includes host IO devices 212-1, 214-1, 216-1, a central processing unit (CPU) complex 202-1, and volatile memory 204-1, each of which is a tangible hardware subsystem. Identical compute node 2 is implemented on a single PCB 201 that includes host IO devices 212-2, 214-2, 216-2, a CPU complex 202-2, and volatile memory 204-2, each of which is a tangible hardware subsystem. Individual host IO devices are configured to communicate with individual host servers to service IOs that include Read commands and Write commands. The volatile memory 204-1, 204-2 may include dynamic random-access memory (DRAM). CPU complexes 202-1, 202-2 are configured to communicate with dual-ported non-volatile storage drives 250 via peripheral component interconnect express (PCIe) switches 252, 254 in a disk array enclosure 256. The dual-ported drives 250 are accessed by the CPU complexes based on common support of a suitable protocol, specification, or standard such as non-volatile memory express (NVMe). For example, non-volatile drives 250 may be NVMe solid state drives (SSDs). The CPU complexes 202-1, 202-2 are interconnected via a PCIe non-transparent bridge (NTB) 258 between PCIe switches 260-1, 260-2.

The PCIe NTB 258 provides fabric-less link 198 (FIG. 1) via which IO loading is balanced. For example, the IO workloads of the CPU complexes 202-1, 202-2 may be balanced to compensate for imbalanced host IO loading on the compute nodes. In response to receipt of a host IO by compute node 1 to read data, a location in local volatile memory 204-1 can be allocated to service the read locally via the interface between CPU complex 202-1 and PCIe switch 260-1 of compute node 1. Alternatively, a location in remote volatile memory 204-2 can be allocated to service the read remotely via the interface between CPU complex 202-2 and PCIe switch 260-2 (avoiding the interface between CPU complex 202-1 and PCIe switch 260-1 of compute node 1). The IO can then be serviced via PCIe NTB 258. Thus, relative loading of the CPU complexes 202-1, 202-2 can be adjusted by selectively allocating locations in either local or remote memory for servicing IOs as will be explained in greater detail below.

Figure 3:
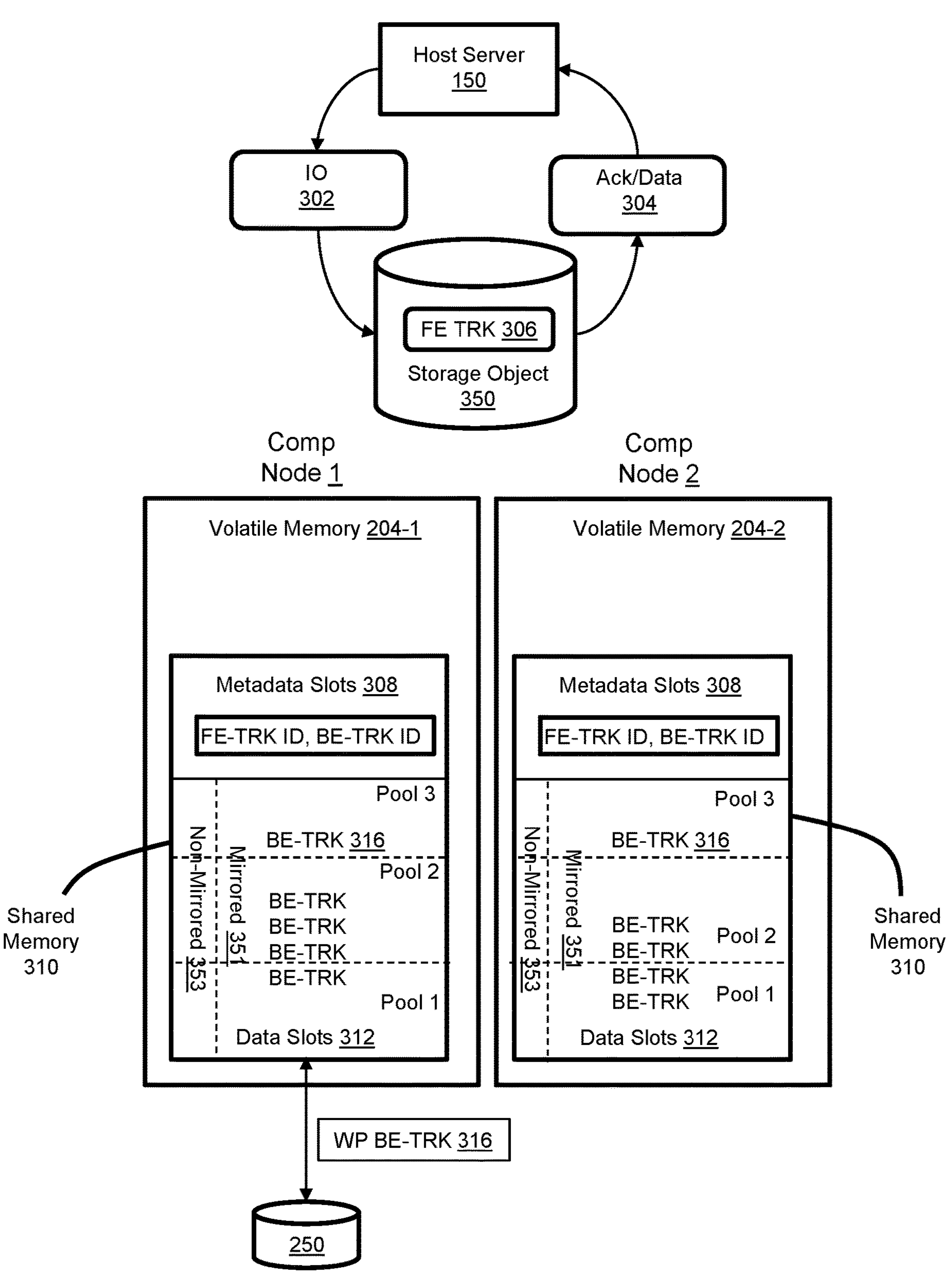
FIG. 3 illustrates allocations of volatile memory.

Referring to FIGS. 2 and 3, host application data is persistently stored on the NVMe drives 250 and, because the drives are not discoverable by the host servers 150, logically stored on a storage object 350 that can be discovered by the host servers. Without limitation, a storage object may be referred to as a volume or device. From the perspective of the host servers 150, the storage object 350 is a single disk having a set of contiguous logical block addresses (LBAs) on which data used by the instances of a host application resides. However, the host application data is stored at non-contiguous addresses on various ones of drives 250. There may be a large number of host servers and the storage array may maintain a large number of storage objects.

Each compute node 1, 2, allocates a fixed amount of its local volatile memory 204-1, 204-2 to a shared memory partition 310 that can be accessed by the other compute node of the engine using remote direct memory access (RDMA) via the PCIe NTB 258. The shared memory 310 includes metadata slots 308 and data slots 312 (aka "cache slots"), each of which is a fixed-size partition of the shared memory 310. The basic allocation units of storage capacity that are used by the compute nodes to access the drives 250 are back-end tracks (BE-TRKs). The host application data is logically stored in front-end tracks (FE-TRKs) on the production storage object 350 and actually stored on BE-TRKs on the NVMe drives 250. The FE-TRKs are mapped to the BE-TRKs and vice versa by FE-TRK IDs and BE-TRK IDs, which are pointers that are maintained in metadata slots 308. More specifically, the BE-TRK IDs are pointers to BE-TRKs of host application data in the data slots. The data slots 312, which function to hold data for processing IOs, are divided into a mirrored segment 351 and a non-mirrored segment 353. The mirrored segment is mirrored by both compute nodes of the engine, whereas the non-mirrored segment is not mirrored. Each segment may be divided into a plurality of pools (e.g., pool 1, pool 2, pool 3) containing data slots/BE-TRKs of different sizes.

The shared memory 310 is used to service IOs from the host servers 150 indifferent ways depending on IO type. In the illustrated example, compute node 1 receives an IO 302 from host 150 with storage object 350 as the target. IO 302 could be a Read or Write command for a FE-TRK 306 that is logically stored on storage object 350. A response to a Write IO is an Ack, whereas a response to a Read IO is data. The response is collectively represented as Ack/Data 304. The compute node 1 uses information in the IO 302 to identify a metadata page corresponding to FE-TRK 306, e.g., by inputting information such as the storage object ID and LBAs into a hash table. The hash table indicates the location of the corresponding metadata page in metadata slots 308. A BE-TRK ID pointer from that metadata page is obtained and used by the compute node to find the corresponding BE-TRK 316 data associated with FE-TRK 306.

The situation in which IO 302 is a Read and the corresponding BE-TRK 316 is already present in the data slots 312 when the IO is received by a host IO device is known as a "cache hit." IO response time latency in the case of a cache hit tends to be low because the volatile memory 204-1, 204-2 has lower access latency than the drives 250 and can be quickly accessed by the data services emulations running on the CPU complexes. However, cache hits do not happen for every IO. If the IO 302 is a Read and the corresponding BE-TRK 316 is not present in the data slots, which is known as a "cache miss," then the data services and back-end emulations locate and retrieve a copy of BE-TRK 316 from the drives 250. More specifically, the BE-TRK 316 is copied into an empty data slot in the pool with the closest sized data slots that are ≥BE-TRK 316 size in the non-mirrored segment 353. That copy is then used to respond to the host server. Background processes recycle the least recently accessed data slots by flushing or evicting the data depending on whether it is flagged as write-pending. The amount of time that data resides in shared memory before being flushed or evicted is referred to as fall-through time (FTT).

If the IO 302 is a Write and the corresponding BE-TRK 316 is not present in the data slots, then the compute node places the Write data into an empty data slot in the pool with the closest sized data slots that are ≥BE-TRK 316 size in the mirrored segment 351 and marks that data slot as write-pending (WP). In accordance with mirroring, the data is copied to the corresponding mirrored segment and pool of the other compute node. Worker threads running in the background eventually de-stage the WP slot data to the managed drives, e.g., overwriting the stale data on the managed drives and flushing the data from the data slots, after which the WP can be cleared. An advantage of memory mirroring is that the first compute node can quickly failover to the second compute node without losing write-pending data in volatile memory or losing the ability to quickly access hot data that is present in volatile memory. The overhead associated with reading a copy of data from local mirrored volatile memory and subsequently sending that copy to remote mirrored volatile memory can be avoided by dual-casting the data to both volatile memory mirrors via PCIe switches 260-1, 260-2 using PCIe NTB 258 before the data is written to either of the volatile memory mirrors.

Figure 4:
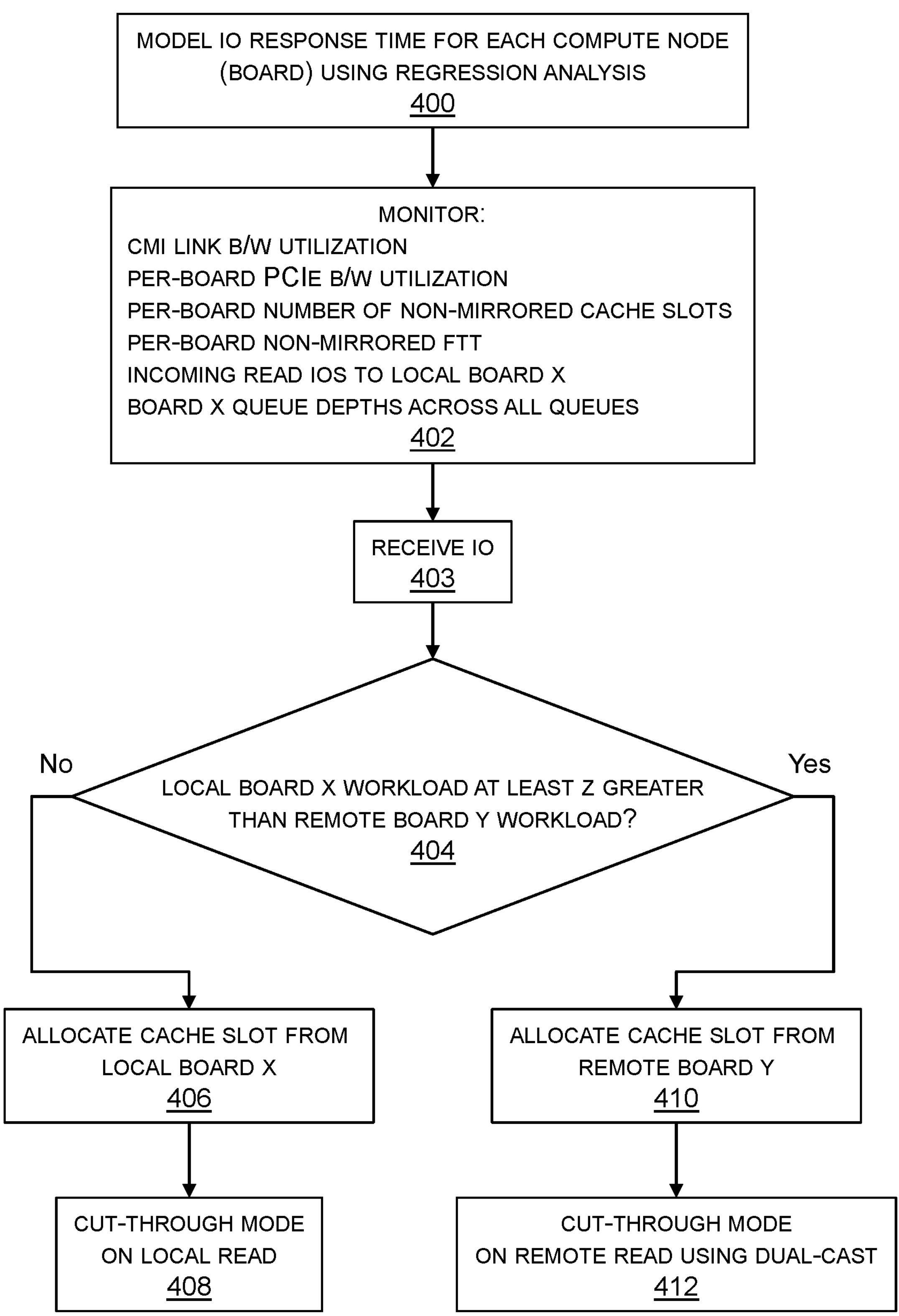
FIG. 4 illustrates a method for fabric-less IO load balancing.

FIG. 4 illustrates a method for fabric-less IO load balancing. The method may be implemented by emulations 103 (FIG. 1). Step 400 is modeling IO response time (RT) of each single-board compute node using regression analysis. The models may be represented as follows:

Expected_Board1_RT=Weight1*CMI_B/W+Weight2*Board1_PCIe_B/W
+Weight3*Board1_Non-Mirrored_FTT
+Weight4*Board1_CPU Utilization
+Weight5*Non-Mirrored_cache_slots_count_Board_1
+Weight6*Board1_queuing
and
Expected_Board2_RT=Weight1*CMI_B/W+Weight2*Board2_PCIe_B/W
+Weight3*Board2_Non-Mirrored_FTT
+Weight4*Board2_CPU Utilization
+Weight5*Non-Mirrored_cache_slots_count_Board_2
+Weight6*Board2_queuing, where CMI_B/W is controller-memory interface bandwidth utilization across the entire RDMA path, PCIe_B/W is utilization of PCIe switch 260, non-mirrored_FTT is the fall-through time of the non-mirrored segment of volatile memory, CPU Utilization is utilization of the CPU complex, Non-Mirrored_cache_slots_count is the number of available data slots in the non-mirrored segment, and queueing is average depth of all IO-related queues. The weights may be learned by applying linear regression techniques with synthetic workloads.

Step 402 is monitoring CMI link bandwidth utilization, per-board PCIe bandwidth utilization, per-board number of non-mirrored cache slots, per-board non-mirrored FTT, incoming read IOs to local board X, and local board X queue depths across all queues, where "board X" corresponds to a compute node. Monitoring and computations may be performed separately for each board. As will be explained below, a comparison is made for "local board X" relative to "remote board Y" for a Read IO received by a host IO device on local board X.

Responsive to receipt of an IO in step 403, step 404 is computing whether the local board X workload exceeds the remote board Y workload by Z, where Z is a predefined variable such as 70%, for example, and without limitation. The workloads are represented by the expected response times computed with the model using the monitored values as inputs. If the local board workload is not at least Z greater than the remote board workload, then a data slot for servicing the IO is allocated from the local volatile memory as indicated in step 406 and cut-through mode is used as indicated in step 408. If the local board workload is at least Z greater than the remote board workload, then a cache slot for servicing the IO is allocated from the remote volatile memory as indicated in step 410 and cut-through mode using dual-cast is used as indicated in step 412. Where compute node 1 is the local board, this enables the Read IO data to be provided to the host server from a host IO device on compute node 1 using the interface between PCIe switch 260-2 and CPU complex 202-2 of compute node 2 over PCIe NTB 258 rather than via the interface between PCIe switch 260-1 and CPU complex 202-1 of compute node 1, thereby helping to achieve a Z-defined balance of IO loading between the CPU complexes.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:

receiving, from a host server, a first input-output (IO) at a first compute node of a storage engine that includes the first compute node and a second compute node that are connected via a fabric-less link between switches and, in response, performing IO load balancing between the first compute node and the second compute node in real time to select either the first compute node or the second compute node to process the first IO by:

using models of IO response time to service host IOs for the first compute node and the second compute node to select the second compute node based on workload on the first compute node exceeding workload on the second compute node by a predetermined amount; and responsive to workload on the first compute node exceeding workload on the second compute node by the predetermined amount, performing load balancing by allocating a data slot in volatile memory of the second compute node for servicing the first IO via the fabric-less link.

2. The method of claim 1 further comprising using cut-through mode on remote read using dual-casting.

3. The method of claim 1 further comprising using the models to compute that workload on the first compute node as represented by response time exceeds workload on the second compute node as represented by response time by the predetermined amount.

4. The method of claim 1 further comprising responsive to receipt of a second IO by the first compute node, using the models to compute that workload on the first compute node as represented by response time does not exceed workload on the second compute node as represented by response time by a predetermined amount and, in response, allocating a data slot in volatile memory of the first compute node for servicing the second IO.

5. The method of claim 4 further comprising using cut-through mode on local read.

6. The method of claim 1 further comprising monitoring, for each compute node, controller memory interface bandwidth utilization, switch utilization, fall-through time of a non-mirrored segment of the volatile memory, central processing unit complex utilization, number of available data slots in the non-mirrored segment of the volatile memory, and average depth of all IO-related queues.

7. The method of claim 6 further comprising inputting monitored values to the model.

8. An apparatus comprising:

- a storage engine comprising a first compute node and a second compute node connected via a fabric-less link between switches;
- a model of input-output (IO) response time for the first compute node;
- a model of IO response time for the second compute node;
- at least one emulation configured, responsive to receipt of a first IO by the first compute node, to use the models to IO load balance between the first compute node and the second compute node in real time by selecting either the first compute node or the second compute node to process the first IO, including being configured to compute that workload on the first compute node exceeds workload on the second compute node by a predetermined amount and, in response, allocate a data slot in volatile memory of the second compute node for servicing the first IO via the fabric-less link to IO load balance.

9. The apparatus of claim 8 further comprising the at least one emulation being configured to use cut-through mode on remote read using dual-casting.

10. The apparatus of claim 8 further comprising the at least one emulation being configured to use the models to compute that workload on the first compute node as represented by response time exceeds workload on the second compute node as represented by response time by the predetermined amount.

11. The apparatus of claim 8 further comprising the at least one emulation being configured, responsive to receipt of a second IO by the first compute node, to use the models to compute that workload on the first compute node as represented by response time does not exceed workload on the second compute node as represented by response time by a predetermined amount and, in response, allocate a data slot in volatile memory of the first compute node for servicing the second IO.

12. The apparatus of claim 11 further comprising the at least one emulation being configured to use cut-through mode on local read.

13. The apparatus of claim 8 further comprising the at least one emulation being configured to monitor, for each compute node, controller memory interface bandwidth utilization, switch utilization, fall-through time of a non-mirrored segment of the volatile memory, central processing unit complex utilization, number of available data slots in the non-mirrored segment of the volatile memory, and average depth of all IO-related queues.

14. The apparatus of claim 13 further comprising the at least one emulation being configured to input monitored values to the models.

15. A non-transitory computer-readable storage medium storing instructions that when executed by a computer perform a method comprising:

- receiving, from a host server, a first input-output (IO) at a first compute node of a storage engine that includes the first compute node and a second compute node that are connected via a fabric-less link between switches and, in response, performing IO load balancing between the first compute node and the second compute node in real time to select either the first compute node or the second compute node to process the first IO by:
  - using models of IO response time to service host IOs for the first compute node and the second compute node to select the second compute node based on workload on the first compute node exceeding workload on the second compute node by a predetermined amount; and
  - responsive to workload on the first compute node exceeding workload on the second compute node by the predetermined amount, performing load balancing by allocating a data slot in volatile memory of the second compute node for servicing the first IO via the fabric-less link.

16. The non-transitory computer-readable storage medium of claim 15 in which the method further comprises using cut-through mode on remote read using dual-casting.

17. The non-transitory computer-readable storage medium of claim 15 in which the method further comprises using the models to compute that workload on the first compute node as represented by response time exceeds workload on the second compute node as represented by response time by the predetermined amount.

18. The non-transitory computer-readable storage medium of claim 15 in which the method further comprises, responsive to receipt of a second IO by the first compute node, using the models to compute that workload on the first compute node as represented by response time does not exceed workload on the second compute node as represented by response time by a predetermined amount and, in response, allocating a data slot in volatile memory of the first compute node for servicing the second IO.

19. The non-transitory computer-readable storage medium of claim 18 in which the method further comprises using cut-through mode on local read.

20. The non-transitory computer-readable storage medium of claim 15 in which the method further comprises inputting monitored values to the models from monitoring, for each compute node, controller memory interface bandwidth utilization, switch utilization, fall-through time of a non-mirrored segment of the volatile memory, central processing unit complex utilization, number of available data slots in the non-mirrored segment of the volatile memory, and average depth of all IO-related queues.

* * * * *